L. C. ROBERTS.
APPARATUS FOR MAKING COMPOSITE SHEETS OF FELT.
APPLICATION FILED FEB. 15, 1918.

1,360,684.

Patented Nov. 30, 1920.

INVENTOR
Leroy C. Roberts
BY
Chas. W. Mortimer
ATTORNEY

UNITED STATES PATENT OFFICE.

LEROY C. ROBERTS, OF SOUTH ORANGE, NEW JERSEY, ASSIGNOR TO THE BARRETT COMPANY, A CORPORATION OF WEST VIRGINIA.

APPARATUS FOR MAKING COMPOSITE SHEETS OF FELT.

1,360,684.   Specification of Letters Patent.   Patented Nov. 30, 1920.

Application filed February 15, 1918. Serial No. 217,406.

*To all whom it may concern:*

Be it known that I, LEROY C. ROBERTS, a citizen of the United States, residing at 117 Oakland road, South Orange, in the county of Essex and State of New Jersey, have invented certain new and useful Improvements in Apparatus for Making Composite Sheets of Felt, of which the following is a specification.

My invention relates to an apparatus for making a composite sheet of felt or similar material in an economical and rapid manner.

It has heretofore been proposed to make a composite sheet of felt or other material consisting of two or more layers, which differ from each other in composition, by providing a single cylinder paper-making machine in which pulps containing the desired materials are introduced into a single tank but are maintained somewhat separated from each other so that the first layer is formed from one batch of pulp, the second layer from another batch, and even a third layer may be formed from a third batch.

My invention has for one of its objects an improvement in this single cylinder paper-making machine above referred to by which the thickness of the different layers can be better controlled and greater flexibility can be obtained in the composition of the various layers.

Other objects and advantages of my invention will be obvious as the description proceeds.

Figure 1:
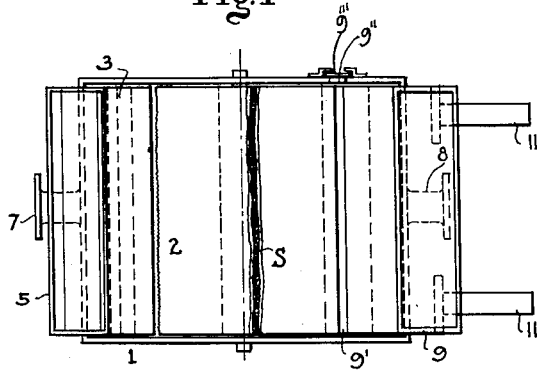
Figure 2:
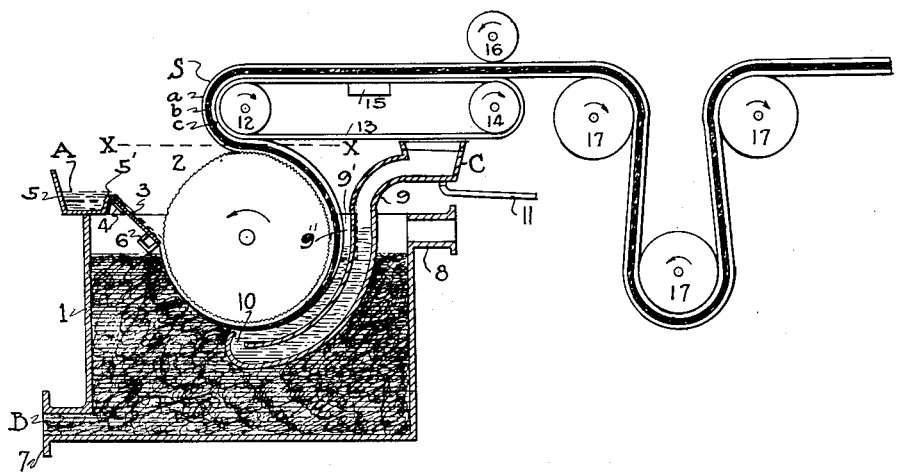

The invention can be clearly understood by reference to the accompanying drawings in which, Figure 1 is a plan view of the tank and cylinder taken along the line x—x of Fig. 2, and Fig. 2 is an elevation of the apparatus.

In these drawings 1 represents a tank into which pulps, differing from each other in composition, are introduced. Dipping into this tank is a perforated or foraminated cylinder 2 which can be revolved in the direction indicated by the arrow. The tank may be provided with an inwardly extending flange or plate 3 hinged at 4 to the trough 5. The plate 3 is provided with a float 6. This plate 3 is of such a length as to extend from one side of the tank 1 to the other but may be shorter, if desired. It does not quite touch the cylinder 2 thus leaving a narrow space between it and the cylinder 2 which can be varied as the plate turns on the hinge 4. Material A may be introduced into tank 1 from trough 5 by flowing in a sheet over the edge 5' of this trough and along the upper surface of the plate 3.

An inlet 7 through which material B may be introduced is provided for the tank 1, and an overflow outlet 8 is provided for the same.

An adjustable inlet 9 for material C leads into tank 1. The inlet 9 is provided with a horizontally disposed nozzle 10 which may be of the same length or a different length from cylinder 2. Means 11 may be provided for adjusting the inlet 9 either radially toward and away from the cylinder 2, or circumferentially along its periphery. A slot 9" in the side of the tank 1 is closed by means of a vertically adjustable slide or plate 9''' thereby providing means for regulating the level of the material in the space 9'.

The operation of this apparatus is as follows:

Pulp A of the desired sort is introduced into the tank 1 through trough 5 and over plate 3. The liquid in the pulp flows through the perforations on foraminous cylinder 2 as is usual in ordinary paper-making machines, thus leaving a thin layer *a* of solid or fibrous particles, forming a felted mass upon the surface of the cylinder when it reaches the pulp B.

Tank 1 is filled as indicated with a different sort of pulp B from inlet 7, and, as the cylinder 2 revolves therein another layer of material *b* is formed outside of layer *a* as the liquid from pulp B passes into the inside of the cylinder and is carried away in the usual manner.

When the pulp C is introduced through inlet 9 it emerges from the outlet 10 and collects in the space 9' between the cylinder 2 and inlet 9. As that portion of the cylinder 2 having the layers *a* and *b* thereon, revolves further, it reaches opening 10 of inlet 9 and space 9' where a third layer *c* of material C is deposited in a manner similar to layers *a* and *b*. Such an amount of pulp C is admitted through inlet 9 as will produce the desired thickness of the layer C. As a result, the level of the material in inlet 9 is maintained slightly above the level of the pulp B. By means of the adjustable slide 9''' the level of the pulp C in the space 9' between the cylinder 2 and the inlet 9 can be regulated. In this way, when the pulp in the space 9' gets too thick the proper amount can be withdrawn by permitting it to run out through the slot 9'' over the top edge of the slide 9'''.

The composite sheet 3 consisting of the three layers a, b and c passes under the couch roll 12 and is picked up by the wet blanket 13 which passes over the rolls 12 and 14. A part of the water is withdrawn from the sheet S by means of the suction box 15. The sheet passes between the rolls 14 and 16 where more water may be squeezed out. Finally, the sheet is passed over heated rolls 17 whereby the drying is completed.

It will be understood that the pulp A may contain wood or rag fibers, mixed with a larger or a smaller portion of disintegrated material, such as asphalt or other bituminous material, or may be entirely free from the same. The pulp B, introduced into tank 1, differs from that in trough 5 in the quantity of bituminous material mixed therein. The pulp C introduced through inlet 9 may differ from either of the others in the proportion of bituminous material which it contains. Preferably, the middle layer b will be formed from pulp which contains a large proportion of bituminous material, while the layers a and c will be formed from pulp which contains very little, if any, bituminous material. In this way a complete sheet will be formed whose inner portion contains much bituminous material and whose outer portions are entirely, or substantially entirely, free from bituminous material, thereby obviating danger of gumming up the drying rolls in the subsequent operation of drying, by the bituminous material sticking thereto.

It is not necessary that the middle layer contain the larger proportion of bituminous material as the proportions may be varied in any or all layers at will, or may be entirely omitted from whichever layer is deemed desirable. The thicknesses of the layers a and b may be varied to some extent by adjusting the plate 3 and varying the amount of pulp A which is supplied. The thickness of the layer c may be varied by adjusting the inlet 9 circumferentially along the cylinder 2, and the thickness of all the layers may be varied by causing the cylinder 2 to revolve at different speeds, thereby varying the time for the layers to accumulate on its surface.

What I claim is:

1. In an apparatus of the class described, a tank containing pulp, a sheet forming means, and means whereby contacting layers of various thicknesses may be formed on said sheet forming means by varying the depth of pulp in said tank.

2. In an apparatus of the class described, a tank, a foraminous cylinder, means for forming a layer substantially free from bituminous material, means for forming a layer containing bituminous material and means adjustable along the periphery of said cylinder for forming a second layer substantially free from bituminous material.

3. In an apparatus for forming a composite sheet, a tank, a foraminous cylinder, a hinged inlet having an opening in proximity to said cylinder, a fixed inlet and a fixed outlet for said tank.

In testimony whereof I affix my signature.

LEROY C. ROBERTS.